United States Patent
Merkel et al.

(10) Patent No.: US 12,255,730 B2
(45) Date of Patent: Mar. 18, 2025

(54) METHOD OF TESTING USER EQUIPMENT FOR NON-TERRESTRIAL NETWORKS AND TEST SYSTEM

(71) Applicant: Rohde & Schwarz GmbH & Co. KG, Munich (DE)

(72) Inventors: Sandra Merkel, Munich (DE); Daniela Raddino, Munich (DE); Rabih El-Masri, Munich (DE); Reiner Stuhlfauth, Munich (DE); Lucas Chavarria-Gimenez, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 624 days.

(21) Appl. No.: 17/560,437

(22) Filed: Dec. 23, 2021

(65) Prior Publication Data
US 2023/0204790 A1 Jun. 29, 2023

(51) Int. Cl.
*H04B 7/185* (2006.01)
(52) U.S. Cl.
CPC ................................ *H04B 7/18519* (2013.01)
(58) Field of Classification Search
CPC ............ H04B 7/18519; H04B 7/18513; H04B 7/18543; H04B 7/185; G01S 19/23; G01S 19/29
See application file for complete search history.

(56) References Cited

U.S. PATENT DOCUMENTS

| | | | | |
|---|---|---|---|---|
| 11,737,042 B2 * | 8/2023 | Huang | ............... | H04W 56/0045 |
| | | | | 370/350 |
| 12,057,925 B2 * | 8/2024 | Qaise | ................. | H04B 7/18504 |
| 2021/0029658 A1 * | 1/2021 | Mahalingam | ..... | H04W 74/0833 |
| 2021/0105693 A1 * | 4/2021 | Tripathi | ................ | H04W 84/06 |
| 2021/0195653 A1 * | 6/2021 | Lei | ......................... | H04L 5/0094 |
| 2021/0227481 A1 * | 7/2021 | Xu | ..................... | H04W 74/0833 |
| 2021/0297147 A1 * | 9/2021 | Qaise | ................. | H04B 7/18539 |

(Continued)

FOREIGN PATENT DOCUMENTS

| | | | | |
|---|---|---|---|---|
| WO | WO-2007109838 A1 * | 10/2007 | ............. | G01S 19/05 |
| WO | 2020092561 A1 | 5/2020 | | |

(Continued)

*Primary Examiner* — Nathan S Taylor
(74) *Attorney, Agent, or Firm* — CHRISTENSEN O'CONNOR JOHNSON KINDNESS PLLC

(57) ABSTRACT

A method of testing user equipment for non-terrestrial networks is described. The method includes, for example, the steps of:
  providing GNSS data and ephemeris data by a test system, wherein the GNSS data is associated with a position of a user equipment (UE) device of a non-terrestrial network, and wherein the ephemeris data is associated with a position of a satellite node of the non-terrestrial network;
  transmitting the GNSS data and the ephemeris data to the UE device;
  determining a timing advance and/or a Doppler pre-compensation shift by the UE device based on the GNSS data and the ephemeris data;
  generating an uplink signal by the UE device based on the determined timing advance and/or the determined Doppler pre-compensation shift; and
  analyzing the uplink signal by the test system in order to assess a performance of the UE device.

Further, a test system for testing user equipment for non-terrestrial networks is described.

20 Claims, 4 Drawing Sheets

(56) References Cited

U.S. PATENT DOCUMENTS

| | | | | |
|---|---|---|---|---|
| 2022/0030511 A1* | 1/2022 | Wang | .................... | H04L 45/302 |
| 2022/0038169 A1* | 2/2022 | Ma | ........................ | H04W 24/08 |
| 2022/0046491 A1* | 2/2022 | Shrestha | ........... | H04W 36/0072 |
| 2022/0070738 A1* | 3/2022 | Tripathi | ................ | H04W 28/24 |
| 2022/0070811 A1* | 3/2022 | Tripathi | .............. | H04W 56/006 |
| 2022/0159741 A1* | 5/2022 | Hoang | .............. | H04W 74/0841 |
| 2022/0224407 A1* | 7/2022 | Shrestha | ............ | H04B 7/18539 |
| 2022/0232503 A1* | 7/2022 | Cheng | ................ | H04W 56/0045 |
| 2022/0286198 A1* | 9/2022 | Khan | ................ | H04W 56/0035 |
| 2022/0361187 A1* | 11/2022 | Sengupta | ........... | H04B 7/18513 |
| 2023/0038022 A1* | 2/2023 | Chen | .................... | H04W 48/08 |
| 2023/0199680 A1* | 6/2023 | Leng | .................... | G01S 19/258 |
| | | | | 370/503 |
| 2023/0284275 A1* | 9/2023 | Khan | ................ | H04W 74/0833 |
| | | | | 370/329 |
| 2023/0397061 A1* | 12/2023 | Huang | .............. | H04W 36/0061 |
| 2024/0064583 A1* | 2/2024 | Maattanen | ............ | H04W 36/08 |

FOREIGN PATENT DOCUMENTS

| | | | | |
|---|---|---|---|---|
| WO | 2020198671 A1 | 10/2020 | | |
| WO | 2021005575 A1 | 1/2021 | | |
| WO | WO-2022148602 A1 * | 7/2022 | .............. | G01S 19/38 |
| WO | WO-2023014271 A1 * | 2/2023 | ........... | G01S 19/396 |
| WO | WO-2023055891 A1 * | 4/2023 | ........... | H04B 17/318 |
| WO | WO-2023059259 A1 * | 4/2023 | | |
| WO | WO-2023086001 A1 * | 5/2023 | ......... | H04B 7/18563 |

\* cited by examiner

METHOD OF TESTING USER EQUIPMENT FOR NON-TERRESTRIAL NETWORKS AND TEST SYSTEM

FIELD OF THE DISCLOSURE

Embodiments of the present disclosure generally relate to methods of testing user equipment for non-terrestrial networks. Embodiments of the present disclosure further relate to test systems for testing user equipment for non-terrestrial networks.

BACKGROUND

With the increasing use of non-terrestrial networks (NTNs) for mobile communication, particularly in combination with the 5G standard, user-side mobile communication devices need to account for a plurality of circumstances in order to guarantee a correct communication with the satellite nodes of the NTN.

For example, a relative position between the user-side mobile communication device and the satellite nodes may be changing rapidly, as the satellite nodes usually are in a non-geosynchronous orbit.

Moreover, velocities of the satellite nodes relative to the user-side communication device may be relatively high, such that the Doppler effect has to be taken into account for a correct communication between the user-side mobile communication device and the satellite nodes.

During or after manufacturing of the user-side mobile communication devices, it has to be ensured that the respective user-side mobile communication device is capable of correctly communicating with satellite node(s) of a non-terrestrial network.

Thus, there is a need for a method and a test system that allow for testing user equipment devices for non-terrestrial network applications.

SUMMARY

Embodiments of the present disclosure provide various methods of testing user equipment for non-terrestrial networks. In an embodiment, a method comprises the steps of:
- providing GNSS data and ephemeris data by a test system, wherein the GNSS data is associated with a position of a user equipment (UE) device of a non-terrestrial network, and wherein the ephemeris data is associated with a position of a satellite node of the non-terrestrial network;
- transmitting the GNSS data and the ephemeris data to the UE device;
- determining a timing advance and/or a Doppler pre-compensation shift by the UE device based on the GNSS data and the ephemeris data;
- generating an uplink signal by the UE device based on the determined timing advance and/or the determined Doppler pre-compensation shift; and
- analyzing the uplink signal by the test system in order to assess a performance of the UE device.

Therein and in the following, the term "analyzing the uplink signal" is understood to denote analyzing the content of the uplink signal and/or analyzing properties of the uplink signal, such as a time of receipt, a frequency content, a power, a bandwidth etc.

The uplink signal may correspond to a request for an uplink allocation from the satellite node. For example, the uplink signal may be associated with a Physical Random Access Channel (PRACH). Thus, the uplink signal may be part of a cell acquisition procedure initiated by the UE device.

Alternatively or additionally, the uplink signal may correspond to a data signal comprising data to be transmitted. In other words, the data signal may comprise data packets that are to be transmitted to the satellite node. The data packets may be associated with content to be transmitted.

The methods according to embodiments of the present disclosure are based on the idea to assess the performance of the UE device by verifying whether the timing advance and/or the Doppler pre-compensation shift has been determined correctly by the UE device in view of the provided GNSS data and in view of the provided ephemeris data.

Therein, the GNSS data may correspond to the actual position of the UE device. However, the test system may also emulate an arbitrary position of the UE device by providing appropriately emulated GNSS data to the UE device.

The test system may generate a downlink signal comprising the GNSS data and may transmit the downlink signal to the UE device.

The ephemeris data corresponds to the ephemeris data of a satellite node that is emulated by the test system. In other words, the ephemeris data may not correspond to an actually existing satellite node, but rather to a satellite node emulated by the test system.

The test system may generate a downlink signal comprising the ephemeris data and may transmit the downlink signal to the UE device in order to transmit the ephemeris data to the UE device.

In some examples, the GNSS data and the ephemeris data may be transmitted to the UE device by the same downlink signal or by different downlink signals.

Due to the provided GNSS data and ephemeris data, the UE device is aware of its own position and of the position of the (emulated) satellite node, respectively. Accordingly, the UE device may determine its distance to the satellite node and may calculate the timing advance based on the determined distance.

Moreover, the UE device may use the ephemeris data in order to determine a velocity of the satellite node, as the ephemeris data may specify the height of the satellite node with respect to the earth, which is uniquely associated with a velocity that is necessary for a stable orbit.

Accordingly, the UE device may determine the Doppler pre-compensation shift based on the determined velocity of the satellite node.

In some examples, the GNSS data and the ephemeris data may provide all information necessary for the UE device in order to determine or at least estimate a relative velocity between the UE device and the satellite node. Thus, the UE device may determine the Doppler pre-compensation shift based on the determined or estimated relative velocity between the UE device and the satellite node.

The test system may emulate a distance between the UE device and the satellite node by adding a time delay to the downlink signal, wherein the time delay corresponds to the emulated distance between the UE device and the satellite node.

The UE device may be established as any electronic device that is capable of communicating with a non-terrestrial network, for example via 5G. For example, the UE device may be a mobile phone, a smartphone, a tablet, a laptop, a ground node, a vehicle infotainment system, etc.

Accordingly, the terms "uplink signal", "downlink signal", "PRACH", etc. may relate to corresponding signals within the 5G framework or protocol, etc.

Generally, the UE device itself may also be configured to analyze the uplink signal in order to assess its own performance. In other words, the uplink signal may be analyzed by the UE device in order to assess a performance of the UE device.

Hence, the uplink signal generated by the UE device may be internally processed, e.g. before its transmission, in order to assess the performance of the UE device. The UE device may comprise a respective processing circuit that is configured to perform the respective analysis.

Moreover, the UE device may receive from the test system further information that may be useful for analyzing the performance of the UE device, namely information concerning the emulated movement of the satellite node. This additional information is used to evaluate the performance of the UE device.

Accordingly, a self-evaluation may be established by the UE device.

According to an aspect of the present disclosure, an expected time window is determined by the test system based on the GNSS data and the ephemeris data, wherein the test system determines whether the uplink signal is received in the expected time window. Accordingly, if the uplink signal is received within the expected time window, it can be concluded that the UE device has determined the timing advance correctly. If, however, the uplink signal is received outside of the expected time window, it can be concluded that the UE device has determined the timing advance incorrectly, which may be an indication for a malfunction of the UE device.

In general, the test system is aware of the GNSS data and the ephemeris data provided to the UE device, i.e., of the emulated position of the UE device and of the emulated position of the satellite node. Thus, the test system can correctly determine the expected time window.

For example, the expected time window may be an expected PRACH occasion window, i.e., a time window in which the receipt of an uplink allocation request sent by the UE device is expected.

According to another aspect of the present disclosure, the expected time window corresponds to an expected round-trip time. Therein, the expected round trip time may have allowed error margins, such that the expected round-trip time corresponds to a round-trip time interval rather than to a single value.

In general, the uplink signal is only received at the expected round-trip time or rather in the expected round-trip time interval if the UE device has determined the timing advance correctly. Thus, if the uplink signal is received outside of the expected round-trip time interval, it can be concluded that the UE device has determined the timing advance incorrectly.

A further aspect of the present disclosure provides that an expected Doppler pre-compensation shift is determined, for example, by the test system based on the GNSS data and the ephemeris data, wherein the test system determines whether the expected Doppler pre-compensation shift has been applied to the uplink signal by the UE device. As already mentioned above, the ephemeris data may specify the height of the satellite node with respect to the earth, which is uniquely associated with a velocity that is necessary for a stable orbit. Accordingly, the test system may determine the expected Doppler pre-compensation shift that is necessary in order to counter the Doppler-shift caused by the velocity of the satellite node relative to the UE device, namely based on the determined velocity of the satellite node.

In an embodiment of the present disclosure, the expected Doppler pre-compensation shift corresponds to an expected frequency window. Accordingly, if the Doppler pre-compensation shift applied to the uplink signal is within the expected frequency window, it can be concluded that the UE device has determined the Doppler pre-compensation shift correctly. If, however, the Doppler pre-compensation shift applied to the uplink signal is outside of the expected frequency window, it can be concluded that the UE device has determined the Doppler pre-compensation shift incorrectly, which may be an indication for a malfunction of the UE device.

In a further embodiment of the present disclosure, the GNSS data is associated with an emulated position of the UE device. In other words, the GNSS data may not correspond to the actual position of the UE device, but rather to an arbitrary position that is emulated by the test system for testing purposes. Accordingly, the performance of the UE device can be tested for several different emulated positions of the UE device, while the UE device can remain stationary in the test system.

In some examples, the ephemeris data is associated with an emulated position of the satellite node. In other words, the ephemeris data may not correspond to an actual position of a real satellite node, but rather to an arbitrary position of an emulated satellite node that is emulated by the test system for testing purposes. Accordingly, the performance of the UE device can be tested for several different emulated positions and/or emulated trajectories of the satellite node, without having to wait for a real satellite node being available for testing.

According to an aspect of the present disclosure, the UE device may generate, for example, a plurality of uplink signals over a predetermined time period, wherein the plurality of uplink signals is analyzed by the test system in order to assess the performance of the UE device. While a connection is established between a UE device and a satellite node, the distance, angle, and relative velocity between the UE device and the satellite node changes over the course of the orbit of the satellite node. In other words, the distance, angle and relative velocity are time-variant, respectively. Thus, the ability of the UE device to correctly account for time-variant conditions may be assessed by the test system.

Therein and in the following, the term "angle" is understood to denote the angle between the satellite node, the UE device, and the horizon from the point of view of the UE device. In other words, the term "angle" relates to the elevation angle under which the UE device sees the satellite node.

In general, the UE device has to account for the time-variance of the distance, angle, and relative velocity between the UE device and the satellite node when determining the timing advance and/or the Doppler pre-compensation shift.

The UE device may determine a time-variant timing advance and/or a time-variant Doppler pre-compensation shift based on the GNSS data and the ephemeris data for the plurality of uplink signals. In other words, the UE device may determine a respective time-variant timing advance and/or a respective time-variant Doppler pre-compensation shift for the uplink signals, for example for each of the uplink signals. Thus, the ability of the UE device to correctly apply time-variant timing advances and/or time-variant Doppler pre-compensation shifts can be assessed by the test system.

According to another aspect of the present disclosure, the predetermined time period may correspond, for example, to the duration of a connection between the satellite node and the UE device. In other words, the predetermined time period corresponds to the time interval spanning from a connection setup between the UE device and the (emulated) satellite node to a connection termination. For example, the time period may have a duration of several minutes.

The connection setup may take place as soon as the satellite node enters a field of view of the UE device. Likewise, the connection may be terminated as soon as the satellite node leaves a field of view of the UE device.

In an embodiment of the present disclosure, an orbital trajectory of the satellite node and/or a movement of the UE device is emulated by the test system. Due to the orbital trajectory and/or due to the movement of the UE device, a relative distance, angle and/or velocity between the UE device and the satellite node changes over time, as described above.

For example, the orbital trajectory may correspond to a low earth orbit trajectory, i.e., to the trajectory of a satellite in about 700 km to 1500 km height. However, it is to be understood that the orbital trajectory may correspond to any other orbit, for example to any other stable orbit.

In some examples, a movement of the UE device may be emulated by providing time-variant GNSS data to the UE device, wherein the time-variant data resembles the movement of the UE device. In other words, while the UE device may remain stationary, the test system provides time-variant GNSS data such that the UE device "thinks" it is moving.

In a further embodiment of the present disclosure, a Doppler-shifted downlink signal is generated by the test system in order to emulate the orbital trajectory of the satellite node and/or the movement of the UE device. In general, the Doppler-shifted downlink signal comprises information about the relative velocity between the UE device and the satellite node, or more precisely about a velocity component of the satellite node in the direction of a connecting axis between the UE device and the satellite node. Thus, information about the relative velocity between the UE device and the satellite node is transmitted to the UE device by the Doppler-shifted downlink signal.

The Doppler-shifted downlink signal may comprise a synchronization signal block (SSB). The synchronization signal block may be employed by the UE device in order to synchronize to a carrier frequency, for example to a carrier frequency associated with the downlink signal. Thus, it is ensured that the UE device can correctly determine the Doppler-shift applied to the downlink signal.

Another aspect of the present disclosure provides that the UE device analyzes, for example, the Doppler-shifted downlink signal in order to determine the timing advance and/or the Doppler pre-compensation shift. In general, the Doppler-shifted downlink signal comprises information about the relative velocity between the UE device and the satellite node, or more precisely about a velocity component of the satellite node in the direction of a connecting axis between the UE device and the satellite node. Accordingly, the UE device may determine the velocity of the satellite node based on the Doppler-shifted downlink signal. Further, the UE device may determine the timing advance and/or the Doppler pre-compensation shift based on the determined velocity.

According to a further aspect of the present disclosure, a Doppler shift applied to the downlink signal may be, for example, time-variant. Accordingly, the test system may simulate that the relative velocity of the UE device to the satellite node changes over the course of the trajectory of the satellite node, for example the velocity component of the satellite node in the direction of a connecting axis between the UE device and the satellite node.

In an embodiment of the present disclosure, a data rate and/or a data throughput is determined in order to assess the performance of the UE device. For example, the data rate associated with uplink signals may be generated by the UE device may be determined in order to assess the performance of the UE device.

A further aspect of the present disclosure provides that an atmospheric and terrestrial fading profile may be, for example, emulated by the test system. Accordingly, additional perturbations that may occur in the atmosphere during transmission of the downlink signal and/or during the transmission of the uplink signal may be emulated by the test system. Thus, the interference immunity of the UE device can be assessed by analyzing the uplink signal generated by the UE device.

A power control command may be transmitted to the UE device by the test system. For example, the power control command may be provided to the UE device by a downlink signal.

The power control command may comprise instructions for the UE device to enter a certain operational mode, for example a standby mode, a receiver mode, and/or a transmitter mode. Thus, the performance of the UE device can be tested for different operational modes of the UE device.

Embodiments of the present disclosure further provide test systems for testing user equipment for non-terrestrial networks. In an embodiment, the test system comprises a signal generator, such as signal generating circuit, at least one antenna array, and an analysis circuit. The signal generator is configured to generate a downlink signal. The downlink signal comprises GNSS data and ephemeris data, wherein the GNSS data is associated with a position of a user equipment (UE) device of a non-terrestrial network, and wherein the ephemeris data is associated with a position of a satellite node of the non-terrestrial network. The at least one antenna array is configured to transmit the downlink signal to the UE device. The at least one antenna array further is configured to receive an uplink signal from the UE device. The analysis circuit is configured to analyze the uplink signal with respect to a timing advance applied to the uplink signal by the UE device and/or with respect to a Doppler pre-compensation shift applied to the uplink signal by the UE device.

The test system may comprise the UE device. The UE device is configured to determine a timing advance and/or a Doppler pre-compensation shift based on the GNSS data and the ephemeris data.

The UE device may be further configured to generate the uplink signal based on the determined timing advance and/or the determined Doppler pre-compensation shift.

In some examples, the test system is configured to perform the method of testing user equipment for non-terrestrial networks described above.

Regarding the further advantages and properties of the test system, reference is made to the explanations given above with respect to the method, which also hold for the test system and vice versa.

According to an aspect of the present disclosure, the test system may comprise, for example, a mobile communication tester, and/or a positioner. In an embodiment, the positioner comprises, for example, one or more linear or rotary stages.

The mobile communication tester may comprise the signal generator and/or a controller (e.g., control circuitry) that is configured to control the test system to perform the method described above.

The positioner may be configured to adapt a relative position between the UE device and the antenna array, such that different relative orientations between the UE device and the antenna array can be set, for example for emulating the trajectory of the satellite node, as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
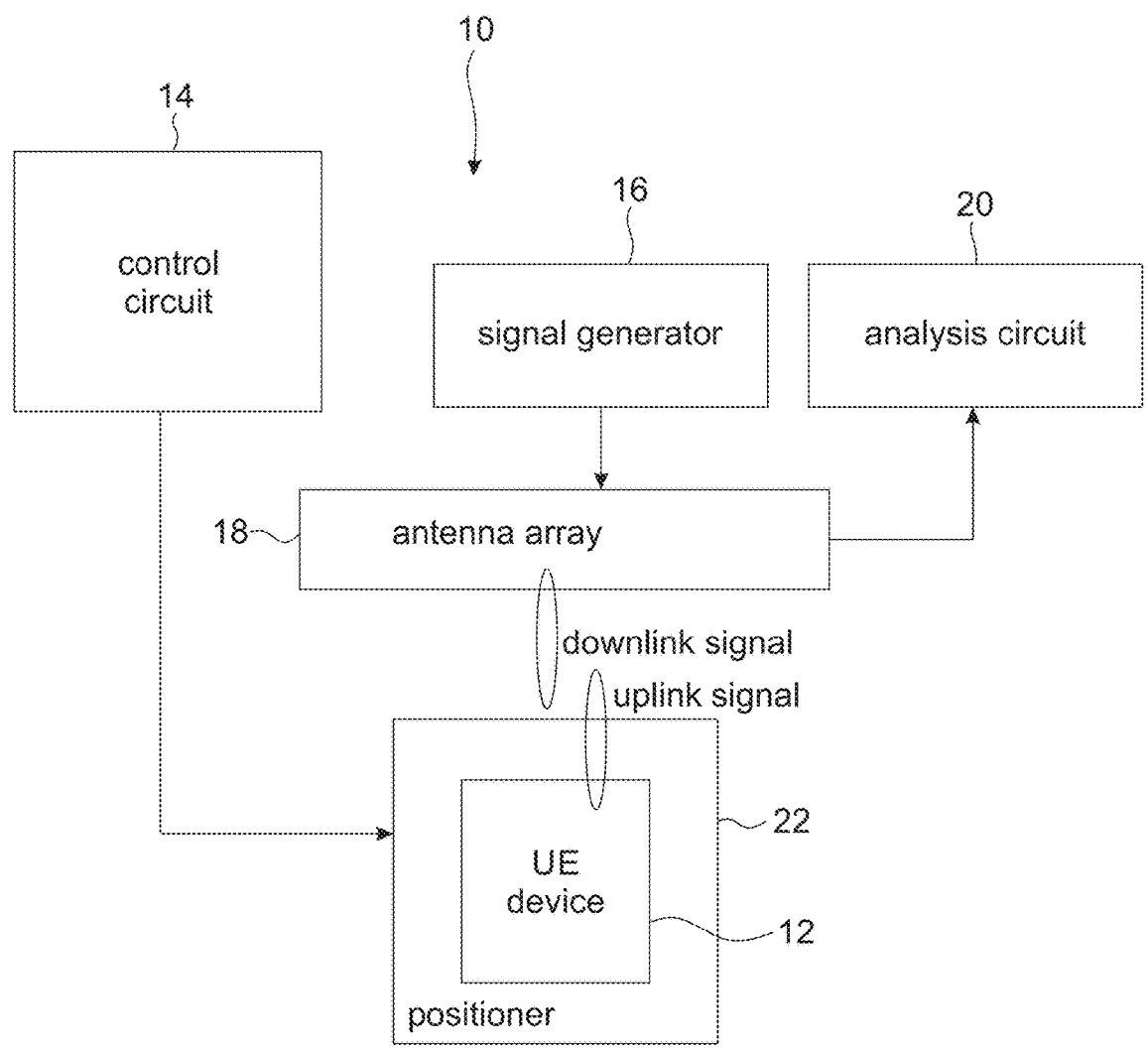
FIG. 1 schematically shows a test system according to an embodiment of the present disclosure.

FIG. 1 schematically shows an embodiment of a test system 10. In general, the test system 10 is configured to assess the performance of a user equipment (UE) device 12 that is configured to communicate with a non-terrestrial network (NTN). Accordingly, the test system 10 may be established as a mobile communication tester, i.e., the UE device 12 may be a mobile communication device.

For example, the UE device 12 may be established as any electronic device that is capable of communicating with a non-terrestrial network, for example via 5G. For example, the UE device 12 may be a mobile phone, a smartphone, a tablet, a laptop, a ground node, a vehicle infotainment system, etc.

Accordingly, the terms "uplink signal", "downlink signal", "PRACH", etc. used in the following may relate to corresponding signals within a 5G framework.

The test system 10 comprises, for example, a control circuit 14, a signal generator 16 comprising a signal generating circuit, at least one antenna array 18, an analysis circuit 20, and a positioner 22. In general, the control circuit 14 is configured to control the signal generator 16, the analysis circuit 20, and/or the positioner 22, as will be described in more detail below.

For example, the control circuit 14 may be established as a computing device with suitable software being executed on the computing device. For example, the control circuit 14 may be established as a personal computer, a MAC, a smartphone, or as another type of smart device with suitable software. Likewise, the analysis circuit 20 may be established as a computing device with suitable software being executed on the computing device. For example, the analysis circuit 20 may be established as a measurement instrument, such as an oscilloscope, for example a digital oscilloscope, a spectrum analyzer, or as a signal analyzer. However, the analysis circuit 20 may also be a personal computer, a MAC, a smartphone, or another type of smart device with suitable software. It is noted that the analysis circuit 20 and the control circuit 14 may also be integrated into a single electronic device.

The positioner 22 is configured to adapt a relative position between the antenna array 18 and the UE device 12. Accordingly, the positioner 22 may comprise a holder that is configured to hold the UE device at a desired location with a desired orientation.

Further, the positioner 22 may comprise positioning means that are configured to adapt a location and/or orientation of the UE device 12. For example, the positioner 22 may comprise a linear positioner that is configured to adapt the location of the UE device 12 and/or a rotational positioner that is configured to adapt the orientation of the UE device 12, for example a revolving table. For example, the positioner 22 in some embodiments may include one or more linear and/or rotary stages.

Alternatively or additionally, the positioner 22 may comprise positioning means that are configured to adapt a location and/or orientation of the antenna array 18. For example, the positioner 22 may comprise a linear positioner that is configured to adapt the location of the antenna array 18 and/or a rotational positioner that is configured to adapt the orientation of the antenna array 18, for example a revolving table.

In either arrangement, the positioner 22 in some embodiments may include one or more linear and/or rotary stages.

The signal generator 16 is configured to generate RF signals and to forward the generated RF signals to the antenna array 18 for transmission. For example, the signal generator 16 may be established as an arbitrary waveform generator or as any other type of suitable signal generator.

The antenna array 18 is configured to transmit the RF signals generated by the signal generator 16 by forming suitable beams in one or several directions, wherein the power and/or physical cell ID (PCI) associated with the beams may be varied appropriately. Further, the antenna array 18 is configured to receive RF signals, for example from the UE device 12.

The analysis circuit 20 is connected to the antenna array 18 in a signal-transmitting manner, such that RF signals received by the antenna array 18 are forwarded to the analysis circuit 20 for further analysis.

Therein and in the following, the term "connected in a signal transmitting manner" is understood to denote a cable-based or wireless connection that is configured to transmit signals between the respective devices or components.

Figure 2:
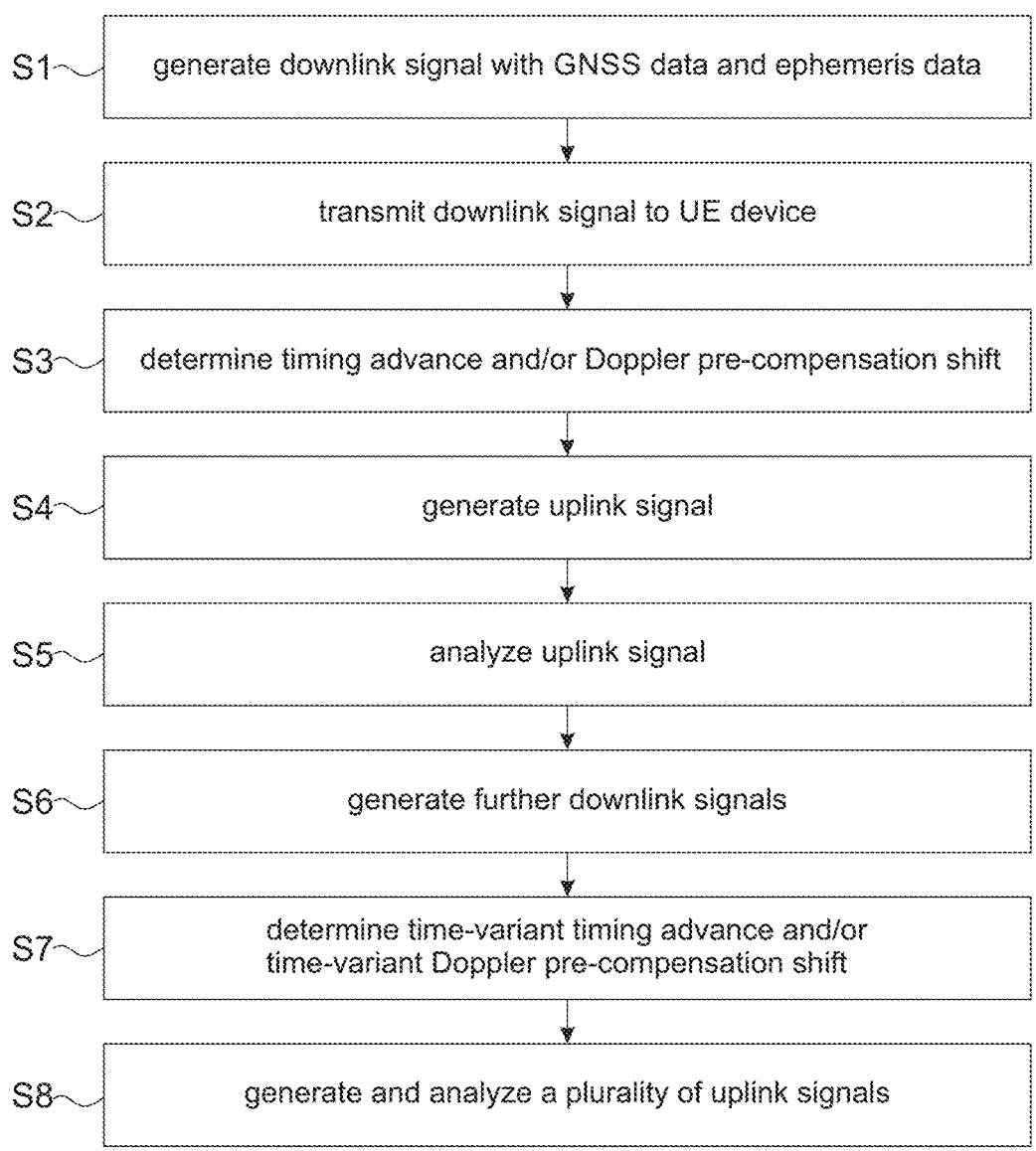
FIG. 2 shows a flow chart of a representative method of testing user equipment for non-terrestrial networks according to an embodiment of the present disclosure.

The control circuit 14 is configured to control the test system 10 to perform a method of testing user equipment for non-terrestrial networks, an example of which is described in the following with reference to FIG. 2.

A downlink signal comprising GNSS data and ephemeris data is generated by the signal generator 16 (step S1).

Figure 3:
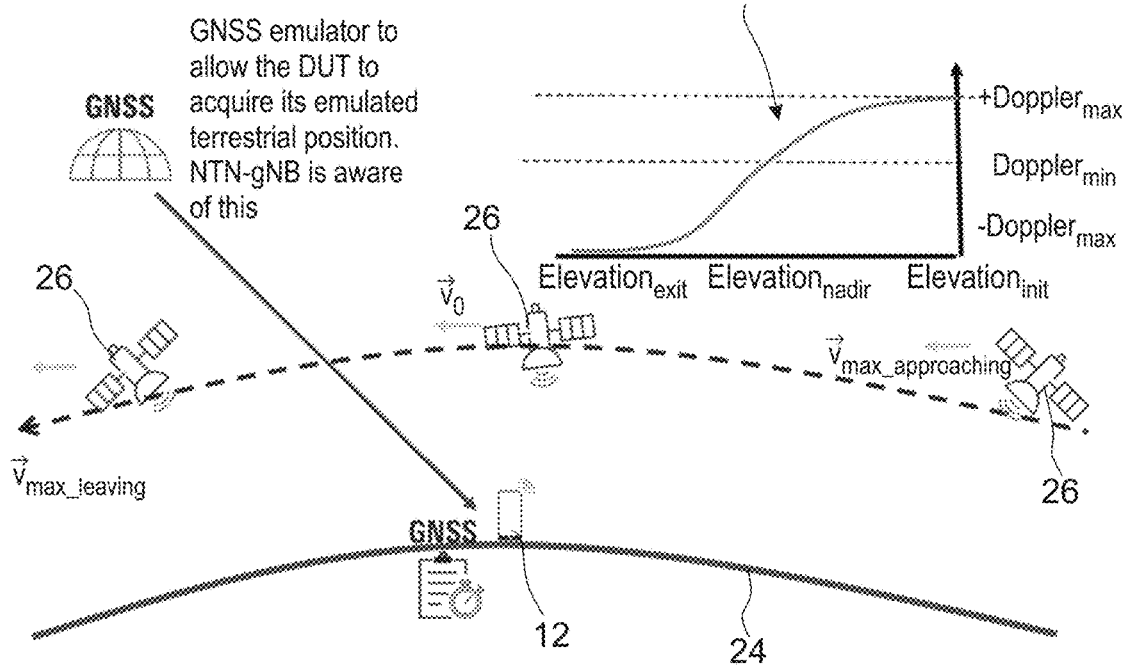
FIGS. 3 to 6 show several diagrams illustrating steps of the method of FIG. 2.

As is illustrated in FIG. 3, the GNSS data is associated with a position of the UE device 12. For example, the GNSS data may correspond to the actual position of the UE device 12 on the surface 24 of earth or to an emulated position of the UE device 12 on the surface 24 of earth. In other words, the test system 10 or rather the signal generator 16 may emulate an arbitrary position of the UE device 12 by synthesizing appropriate GNSS data.

The ephemeris data corresponds to the ephemeris data of a satellite node 26 that is emulated by the test system 10. In other words, the ephemeris data may not correspond to an actually existing satellite node, but rather to the satellite node 26 emulated by the test system 10. The satellite node 26 may also be referred to as "NTN-gNB".

Accordingly, the downlink signal generated by the test system 10 comprises information at least on the position of the UE device 12 and on the position of the emulated satellite node 26.

However, as is further illustrated in FIG. 3, the downlink signal may further comprise information on a relative velocity v of the satellite node 26 and the UE device 12.

In other words, the test system 10 is configured to emulate a trajectory of the satellite node 26 in its orbit around earth.

The relative velocity between the satellite node 26 and the UE device 12 stems from the movement of the satellite node 26 in its orbit around earth and/or from a movement of the UE device 12 on the surface 24 of the earth.

For example, the orbit of the satellite node 26 may correspond to a low earth orbit trajectory, i.e., to the trajectory of a satellite in about 700 km to 1500 km height. However, it is to be understood that the orbit may be any other orbit, for example to any other stable orbit.

Without restriction of generality, it is assumed in the following that the UE device 12 is not moving with respect to the surface 24 of the earth, such that the relative velocity between the satellite node 26 and the UE device 12 is due the movement of the emulated satellite node 26 in its orbit.

In order to emulate the relative velocity between the satellite node 26 and the UE device 12, the downlink signal may be Doppler-shifted appropriately. The Doppler-shift depends on a velocity component of the satellite node 26 in the direction of a connecting axis between the UE device 12 and the satellite node 26. Thus, the Doppler-shift is dependent on a relative position between the UE device 12 and the satellite node 26.

For example, the Doppler-shift may have the functional form 28 qualitatively illustrated in FIG. 3. The magnitude of the Doppler-shift becomes higher the further the satellite node 26 is away from a position in the zenith over the UE device 12. The magnitude of the Doppler shift is lowest, for example zero, if the satellite node 26 is in the zenith over the UE device 12. In other words, the Doppler-shift is lowest if the UE device 12 is in the nadir of the satellite node 26.

The Doppler-shifted downlink signal may comprise a synchronization signal block (SSB). The SSB may be employed by the UE device 12 in order to synchronize to a carrier frequency, for example to a carrier frequency associated with the downlink signal. Thus, it is ensured that the UE device 12 can correctly determine the Doppler-shift applied to the downlink signal.

Alternatively or additionally, the downlink signal may comprise a power control command. The power control command may comprise instructions for the UE device 12 to enter a certain operational mode, for example a standby mode, a receiver mode, and/or a transmitter mode.

The (Doppler-shifted) downlink signal is transmitted to the UE device 12 by the antenna array 18 (step S2).

The UE device 12 processes the received downlink signal and determines a timing advance and/or a Doppler pre-compensation shift based on the received downlink signal (step S3).

For example, the UE device 12 determines the timing advance and/or the Doppler pre-compensation shift based on the GNSS data and the ephemeris data provided via the downlink signal. Optionally, the UE device 12 may determine the Doppler pre-compensation shift based on the Doppler-shift of the downlink signal.

Therein, the timing advance corresponds to an adjustment of the sending time of uplink signals in order to compensate a propagation delay between the UE device 12 and the satellite node 26, as is well known in the field of mobile communication, for example within the 4G or 5G framework.

Moreover, the Doppler pre-compensation shift corresponds to a Doppler shift that is necessary to counteract the Doppler shift induced by the relative velocity between the satellite node 26 and the UE device 12.

The necessary timing advance and the necessary Doppler pre-compensation shift depend on the distance, the angle, and the relative velocity between the UE device 12 and the satellite node 26.

Figure 4:
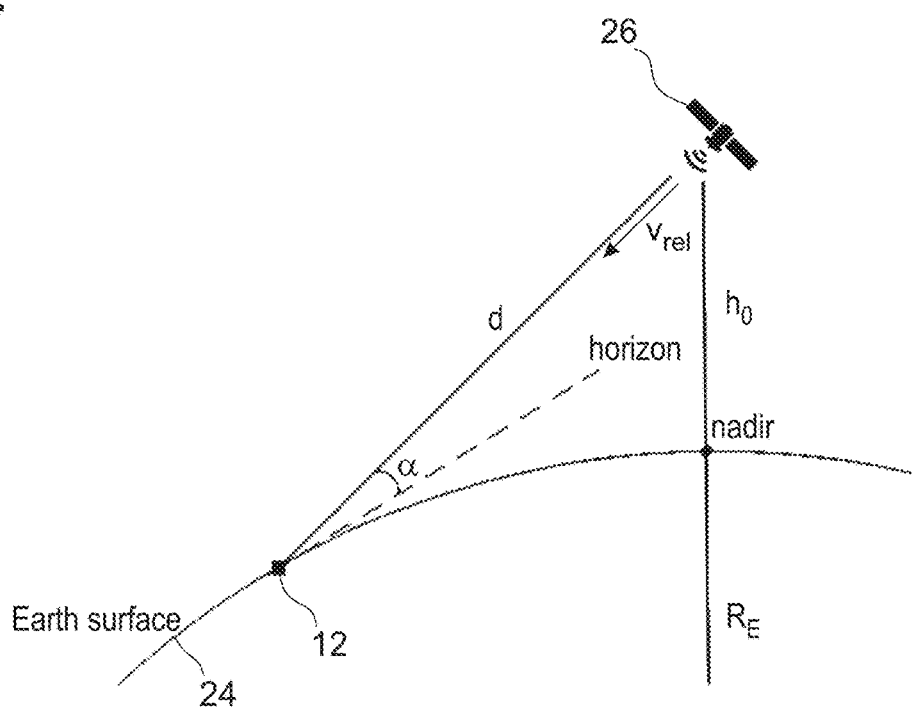

The UE device 12 may determine the distance d, the angle $\alpha$, and the relative velocity $v_{rel}$ between the UE device 12 and the satellite node 26 based on the GNSS data and the ephemeris data, as is illustrated in FIG. 4.

In some examples, the UE device 12 may determine the distance according to the formula $$d = \sqrt{R_E^2 \sin^2\alpha + h_0^2 + 2h_0 R_E} - R_E \sin\alpha$$

wherein $R_E$ is the radius of earth, $h_0$ is the height of the satellite node 26 above the surface 24 of the earth, and $\alpha$ is the angle between the satellite node 26, the UE device 12, and the horizon from the point of view of the UE device 12.

A first uplink signal is generated by the UE device 12 based on the determined timing advance and/or based on the determined Doppler pre-compensation shift (step S4).

The first uplink signal may correspond to a request for an uplink allocation from the satellite node 26. Thus, the first uplink signal may be associated with a Physical Random Access Channel (PRACH). In other words, the first uplink signal may be part of a cell acquisition procedure initiated by the UE device 12.

The first uplink signal is transmitted to the antenna array 18, received by the antenna array 18, and forwarded to the analysis circuit 20. The first uplink signal is analyzed by the analysis circuit 20 in order to assess a performance of the UE device 12 (step S5).

Therein and in the following, the term "analyzing an uplink signal" is understood to denote analyzing the content of the uplink signal and/or analyzing properties of the uplink signal, such as a time of receipt, a frequency content, a power, a bandwidth etc.

In general, the analysis circuit 20 assesses whether a correct timing advance and/or a correct Doppler pre-compensation shift has been applied to the uplink signal by the UE device 12 in view of the provided GNSS data and in view of the provided ephemeris data.

In order to assess whether the correct timing advance has been applied, the analysis circuit 20 may determine an expected time window based on the GNSS data and the ephemeris data.

Figure 5:
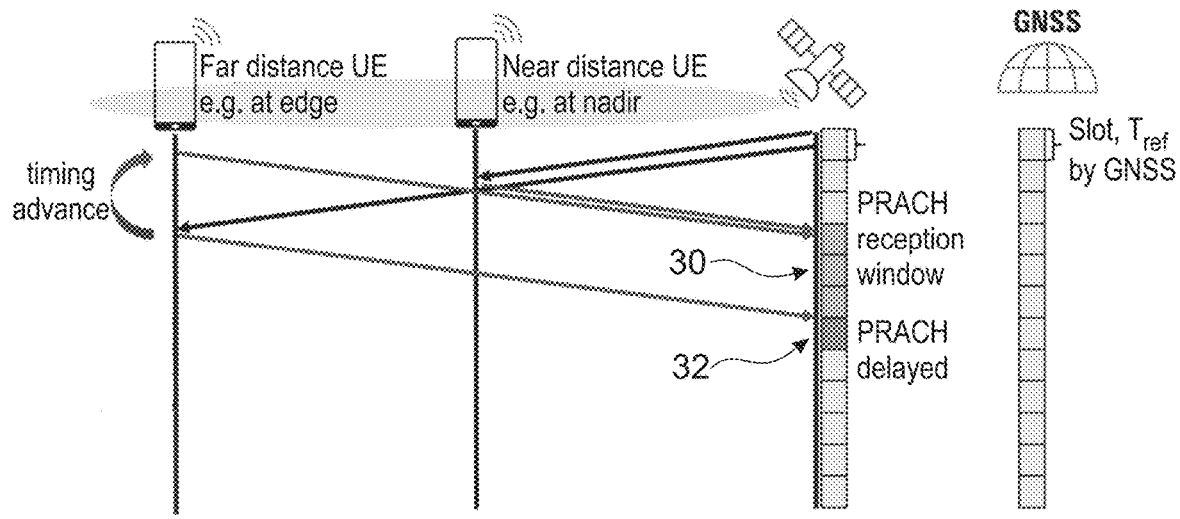

As is illustrated in FIG. 5, the expected time window may be an expected PRACH occasion window 30, i.e., a time window in which the receipt of an uplink allocation request sent by the UE device 12 is expected with respect to a reference time $T_{ref}$, for example wherein the reference time $T_{ref}$ may correspond to the time of sending the downlink signal.

Alternatively or additionally, the expected time window corresponds to an expected round-trip time, i.e., a time between sending the downlink signal and receiving the corresponding uplink signal. The expected round trip time may have allowed error margins, such that the expected round-trip time corresponds to a round-trip time interval rather than to a single value.

The analysis circuit 20 is aware of the GNSS data and the ephemeris data provided to the UE device 12, i.e., of the emulated position of the UE device 12 and of the emulated position of the satellite node 26. Thus, the analysis circuit 20 can correctly determine the expected time window.

If the uplink signal is received within the expected time window, it can be concluded that the UE device 12 has determined the timing advance correctly.

If, however, the uplink signal is received outside of the expected time window at a time 32 later or earlier than the expected time window, it can be concluded that the UE device 12 has determined the timing advance incorrectly, which may be an indication for a malfunction of the UE device 12.

In order to assess whether a correct Doppler pre-compensation shift has been applied to the uplink signal by the UE device 12, the analysis circuit 20 may determine an expected Doppler pre-compensation shift based on the GNSS data and the ephemeris data, and optionally based on the Doppler-shift applied to the downlink signal. In an embodiment, the expected Doppler pre-compensation shift may correspond to an expected frequency window.

Accordingly, if the Doppler pre-compensation shift applied to the uplink signal or the frequency of the uplink signal itself is within the expected frequency window, it can be concluded that the UE device 12 has determined the Doppler pre-compensation shift correctly.

If, however, the Doppler pre-compensation shift applied to the uplink signal or the uplink signal itself is outside of the expected frequency window, it can be concluded that the UE device 12 has determined the Doppler pre-compensation shift incorrectly, which may be an indication for a malfunction of the UE device 12.

Once a communication is established between the emulated satellite node 26 and the UE device 12, the test system 10 may generate and transmit further downlink signals in order to continue the assessment of the performance of the UE device 12 (step S6).

In some examples, the test system 10 may provide time-variant GNSS data to the UE device 12 by the further downlink signals, wherein the time-variant data resembles a movement of the UE device 12. In other words, while the UE device 12 may remain stationary within the test system 10, the test system 10 provides time-variant GNSS data such that the UE device 12 "thinks" it is moving.

Moreover, a Doppler-shift applied to the downlink signals may be time-variant, such that the change of the relative velocity between the UE device 12 and satellite node 26 over the course of the trajectory of the satellite node 26 is correctly emulated.

The UE device 12 processes the further downlink signals and determines a time-variant timing advance and/or a time-variant Doppler pre-compensation shift based on the further downlink signals (step S7).

However, it is also conceivable that the UE device 12 determines the time-variant timing advance and/or a time-variant Doppler pre-compensation shift based on the first downlink signal provided by the test system 10.

The test system 10 may emulate the (time-variant) distance between the UE device 12 and the satellite node 26 by adding an appropriate (time-variant) delay to the downlink signals, wherein the delay corresponds to the emulated (time-variant) distance between the UE device 12 and the satellite node 26.

A plurality of uplink signals is generated by the UE device 12 over a predetermined time period, wherein the plurality of uplink signals is analyzed by the analysis circuit 20 in order to assess the performance of the UE device 12 (step S8).

Thus, the analysis circuit 20 may assess whether the UE device 12 correctly applies the time-variant timing advance and/or the time-variant Doppler pre-compensation shift to the plurality of uplink signals. In other words, the analysis circuit 20 determines whether the UE device 12 functions correctly under time-variant conditions, namely a time-variant distance, angle and speed relative to the satellite node 26.

Figure 6:
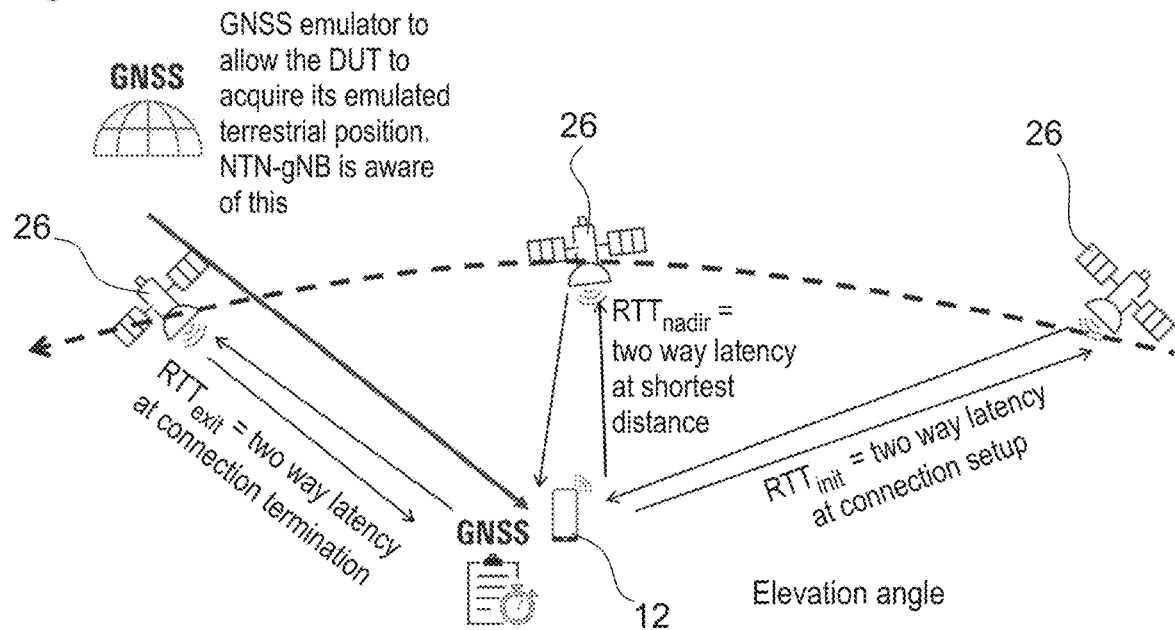

As is illustrated in FIG. 6, the predetermined time period may correspond to the duration of a connection between the satellite node 26 and the UE device 12. In other words, the predetermined time period may correspond to the time interval spanning from a connection setup between the UE device 12 and the emulated satellite node 26 to a connection termination.

Step S8 may be performed essentially analogous to steps S4 and S5 described above. However, the expected time window and/or the expected Doppler pre-compensation shift may be time-variant as well, as the expected round-trip time ("RTT" in FIG. 6) varies over time as well.

For example, the expected round-trip time $RTT_{init}$ at connection setup and the expected round-trip time $RTT_{exit}$ at connection termination are longer than to the expected round-trip time $RTT_{nadir}$ when the UE device 12 is in the nadir of the simulated satellite node 26.

In some examples, the plurality of uplink signals may correspond to a plurality of data signals instead of an uplink allocation request. Thus, the plurality of uplink signals may correspond to data signals comprising data packets to be transmitted to the satellite node 26.

Accordingly, the analysis circuit 20 may determine a data rate and/or a data throughput associated with the uplink signals in order to assess the performance of the UE device 12. Optionally, the test system 10 or the signal generator 16 may emulate an atmospheric and terrestrial fading profile. Accordingly, additional perturbations that may occur in the atmosphere during transmission of the downlink signal and/or during the transmission of the uplink signal(s) may be emulated by the test system 10. Thus, the interference immunity of the UE device may be assessed by the analysis circuit 20 by analyzing the uplink signal(s) generated by the UE device 12.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In some embodiments, the functionality described herein can be implemented by special purpose hardware-based computer systems or circuits, etc., or combinations of special purpose hardware and computer instructions.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method of testing user equipment for non-terrestrial networks, the method comprising the steps of:
    providing GNSS data and ephemeris data by a test system, wherein the GNSS data is associated with a position of a user equipment (UE) device of a non-terrestrial network, and wherein the ephemeris data is associated with a position of a satellite node of the non-terrestrial network;
    transmitting the GNSS data and the ephemeris data to the UE device;
    determining at least one of a timing advance or a Doppler pre-compensation shift by the UE device based on the GNSS data and the ephemeris data;
    generating an uplink signal by the UE device based on at least one of the determined timing advance or the determined Doppler pre-compensation shift; and
    analyzing the uplink signal by the test system in order to assess a performance of the UE device.

2. The method of claim 1, wherein an expected time window is determined by the test system based on the GNSS data and the ephemeris data, and wherein the test system determines whether the uplink signal is received in the expected time window.

3. The method of claim 1, wherein the expected time window corresponds to an expected round-trip time.

4. The method of claim 1, wherein an expected Doppler pre-compensation shift is determined by the test system based on the GNSS data and the ephemeris data, and wherein the test system determines whether the expected Doppler pre-compensation shift has been applied to the uplink signal by the UE device.

5. The method of claim 4, wherein the expected Doppler pre-compensation shift corresponds to an expected frequency window.

6. The method of claim 1, wherein the GNSS data is associated with an emulated position of the UE device.

7. The method of claim 1, wherein the ephemeris data is associated with an emulated position of the satellite node.

8. The method of claim 1, wherein the UE device generates a plurality of uplink signals over a predetermined time period, and wherein the plurality of uplink signals is analyzed by the test system in order to assess the performance of the UE device.

9. The method of claim 8, wherein the UE device determines at least one of a time-variant timing advance or a time-variant Doppler pre-compensation shift based on the GNSS data and the ephemeris data for the plurality of uplink signals.

10. The method of claim 8, wherein the predetermined time period corresponds to the duration of a connection between the satellite node and the UE device.

11. The method of claim 1, wherein at least one of an orbital trajectory of the satellite node or a movement of the UE device is emulated by the test system.

12. The method of claim 11, wherein a Doppler-shifted downlink signal is generated by the test system in order to emulate at least one of the orbital trajectory of the satellite node or the movement of the UE device.

13. The method of claim 12, wherein the Doppler-shifted downlink signal comprises a synchronization signal block (SSB).

14. The method of claim 12, wherein the UE device analyzes the Doppler-shifted downlink signal in order to determine at least one of the timing advance or the Doppler pre-compensation shift.

15. The method of claim 12, wherein a Doppler shift applied to the downlink signal is time-variant.

16. The method of claim 1, wherein at least one of a data rate or a data throughput is determined in order to assess the performance of the UE device.

17. The method of claim 1, wherein an atmospheric and terrestrial fading profile is emulated by the test system.

18. The method of claim 1, wherein a power control command is transmitted to the UE device by the test system.

19. A test system for testing user equipment for non-terrestrial networks, wherein the test system comprises a signal generator, at least one antenna array, and an analysis circuit,
    wherein the signal generator is configured to generate a downlink signal, wherein the downlink signal comprises GNSS data and ephemeris data, wherein the GNSS data is associated with a position of a user equipment (UE) device of a non-terrestrial network, and wherein the ephemeris data is associated with a position of a satellite node of the non-terrestrial network,
    wherein the at least one antenna array is configured to transmit the downlink signal to the UE device,
    wherein the at least one antenna array further is configured to receive an uplink signal from the UE device, and
    wherein the analysis circuit is configured to analyze the uplink signal with respect to at least one of a timing advance applied to the uplink signal by the UE device or a Doppler pre-compensation shift applied to the uplink signal by the UE device.

20. The test system of claim 19, wherein the test system comprises at least one of a mobile communication tester or a positioner.

* * * * *